United States Patent
Harada

[19]

[11] Patent Number: 6,094,618
[45] Date of Patent: Jul. 25, 2000

[54] ON-VEHICLE DEVICE CONTROL SYSTEM AND CONTROL APPARATUS THEREIN

[75] Inventor: Tomoyasu Harada, Susono, Japan

[73] Assignee: Toyota Jidosha Kabushiki Kaisha, Aichi-ken, Japan

[21] Appl. No.: 09/137,411

[22] Filed: Aug. 20, 1998

[30] Foreign Application Priority Data

Oct. 17, 1997 [JP] Japan ................................ 9-285865

[51] Int. Cl.⁷ ........................ H04B 7/26; G06F 165/00
[52] U.S. Cl. .................... 701/207; 701/36; 701/208; 340/988
[58] Field of Search ................ 701/1, 2, 23, 24, 701/25, 26, 36, 49, 202, 207, 208, 213; 340/988, 990, 995; 180/167, 168, 169; 318/587

[56] References Cited

U.S. PATENT DOCUMENTS

| | | | |
|---|---|---|---|
| 4,855,822 | 8/1989 | Narendra et al. | 701/2 |
| 4,986,384 | 1/1991 | Okamoto et al. | 701/24 |
| 5,247,440 | 9/1993 | Capurka et al. | 701/49 |
| 5,635,924 | 6/1997 | Tran et al. | 701/1 |
| 5,806,018 | 9/1998 | Smith et al. | 701/24 |
| 5,867,089 | 2/1999 | Zyburt et al. | 701/23 |
| 5,917,405 | 6/1999 | Joao | 701/36 |

FOREIGN PATENT DOCUMENTS

| | | |
|---|---|---|
| 62-8813 | 1/1987 | Japan. |
| 4-317835 | 11/1992 | Japan. |
| 5-180023 | 7/1993 | Japan. |
| 7-279702 | 10/1995 | Japan. |
| 8-294178 | 11/1996 | Japan. |
| 9-035183 | 2/1997 | Japan. |

*Primary Examiner*—Gary Chin
*Attorney, Agent, or Firm*—Finnegan, Henderson, Farabow, Garrett & Dunner, L.L.P.

[57] ABSTRACT

An information center provides a control program which is usable by a vehicle within its effective area. The control program may be transmitted to a vehicle in conjunction with the effective area through a broadcast antenna. According to the detected result of the current location, a control apparatus on a vehicle applies a control program to device control when the current location sites within the effective area. The vehicle can take possession of a control program fits to a region at any places to which it moves and can utilize those. It is possible to substitute an effective period for the effective area.

10 Claims, 5 Drawing Sheets

ON-VEHICLE DEVICE CONTROL SYSTEM AND CONTROL APPARATUS THEREIN

BACKGROUND OF THE INVENTION

1. Field of the Invention

This invention relates to an apparatus for controlling a device equipped on a vehicle and, more particularly, to an apparatus which easily executes appropriate device control when environmental conditions and regulatory requirements change depending on locations or time.

2. Description of the Related Art

As vehicle electronic control technology progresses, more and more on-vehicle devices are controlled by control apparatus comprising built-in computers. Control apparatuses designed specifically for each on-vehicle device as well as those which perform integrated control for a plurality of on-vehicle devices are commonly provided. Such control apparatuses store a control program specific to an on-vehicle device that control in a program memory and control the on-vehicle device according to the control program.

Such an on-vehicle device may be arbitrary device operated by computer control such as, for example, a combustion engine, an electric motor, a navigation unit, or an air conditioner.

Motor vehicles typically drive over wide and varying regions during the course of user operation and face circumstances that vary according to the region in which it operates. Even if operating in a single region, the surrounding circumstances will change according to time of day or season of the year. To be more specific, climatic (weather) and road conditions will change. It is also possible that region-by-region requirements for vehicles (such as regulatory requirements imposed on a vehicle) will vary according to location or time.

A control apparatus for an on-vehicle device must perform adequate control under all operating circumstances. In Japanese Patent Laid-Open Publication No. Hei 5-180023, for example, motor output control corresponding to a driving location is suggested. This art attempts to respond to the need only with a method of improving a control program to support a change in circumstances. Although this approach does allow device performance to improve, it has serious disadvantages including those of increasing the complexity of the program itself and of its control processes, increasing the size of the program, requiring larger storage capacity for the larger programs, and increasing costs by requiring, for example, the addition of new sensors.

With the current state of the art, a large number of device control apparatuses are not able to respond to changes in environmental conditions and even fewer are able to deal with changed regulatory requirements. For example, while a motor control program may use temperature or a similar environmental condition as a parameter to execute control appropriate to that environment, and attempt, as a goal, to produce greater power while reducing the level of emissions, configuring such a program to responds various environments with attention to all details causes the size of the program to increase as its complexity increases. Furthermore, the complexity and the size of such a program will expand as it is improved to support regulatory requirements.

Some on-vehicle device control apparatuses are equipped with a known control program designed for use in cold climates that warms a battery using a heater. This is a control program specific to a certain region. Programs of this nature are only used under particular circumstances. To equip a seldom used program is profitless and has disadvantages in terms of storage capacity.

Referring now to a hybrid car a well known vehicle type equipped both a combustion engine and an electric motor, as an example, the mode selection of a usage pattern of an engine and an electric motor allows reducing noise and the amount of emission gas, and allows enhancing motion performance by producing higher power. This can simultaneously fulfill the two conflicting criterion of low noise and high performance. Therefore, a hybrid car is expected to be one which could change its performance in order to fit environmental conditions and regulatory requirements. For instance, such a vehicle may drive mainly using the electric motor individually as a motor when it drives in a region where rigorous anti-noise regulations are established. In order to exploit such advantages, however, the conventional control apparatus needs to collect information about environmental conditions and regulatory requirements and must include a control program which can utilize the gathered information and, when regulatory requirements are changed, the control program should be updated. This is very difficult and, considering such difficult circumstances, an easier means to exploit the full potential of a hybrid car is greatly desired.

As mentioned above, known approaches include improving a control program or adding a special program for the purpose of the control supporting changes in circumstances such as environmental conditions and regulatory requirements. This approach has many disadvantages as were outlined above.

SUMMARY OF THE INVENTION

It is an object of the present invention to provide an on-vehicle device control system and control apparatus provided therein which make the device control, supporting various changes in circumstances varying with driving locations or time, implementable easily and inexpensively.

(1) In order to achieve the object, according to one aspect of the present invention, an on-vehicle device control system which controls an on-vehicle device equipped on a vehicle, comprises an information center for transmitting a control program to be used for controlling said on-vehicle device to said vehicle in conjunction with data designating the effective area of said program, and a control apparatus equipped on said vehicle for controlling said on-vehicle device through the use of said control program transmitted from said information center, said control apparatus, including a positioning means for detecting the current position of said vehicle and applying said control program when the detected current position lies within said effective area.

An on-vehicle device, here, is any arbitrary device suited to programmed control. A program to be transmitted may be an entire program for control of an on-vehicle device or a program module handled as a part of the entire program.

According to the present invention, a control apparatus receives a control program in conjunction with its effective area and applies the received program to device control within the effective area. Therefore, in the corresponding region it is possible to take possession of a specific control program fitting to and required for the region in order to use those. This enables the control to respond to varying environmental or regulatory circumstances between locations and eliminates the need for a complex program to support various circumstances. It is these possible to avoid an increase in size of storage capacity of a program memory and eliminates the waste equipping a particular program in a region where it is unnecessary. Therefore it becomes possible to easily and inexpensively execute device control supporting various changes in circumstances.

(2) In another aspect of the present invention, an on-vehicle device control system which controls an on-vehicle device equipped on a vehicle, comprises an information center for transmitting a control program to be used for controlling said on-vehicle device to said vehicle in conjunction with data designating the effective period during which said control program should be applied, and a control apparatus equipped on said vehicle for controlling said on-vehicle device through the use of said control program transmitted from said information center; and said control apparatus includes time detecting means and applies said control program when the detected present time is within said effective period.

In this aspect, a control apparatus receives a control program in conjunction with its effective time period and applies the received one to device control during the effective period. Therefore, in the corresponding period, it is possible to take possession of a specific control program fitting to and required for that period. This enables the control to respond to circumstances varying with time. This aspect also avoids an increasing program complexity or size of storage capacity and waste to equip a particular program always. Therefore it becomes possible to execute device control supporting various changes in circumstances easily and inexpensively.

(3) In another aspect of the present invention, a control program is sent in conjunction with data designating both its effective area and effective period. This enables the control program, fitting to or needed from the regions and periods, to be applied in the corresponding region and period, and this produces, as a result, a preferable effect.

Moreover, a control system of the present invention effectively utilizes data communications between a vehicle and the outside thereof, and this system may be situated as part of the ITS (Intelligent Transport Systems).

DESCRIPTION OF PREFERRED EMBODIMENTS

EMBODIMENT 1

Figure 1:
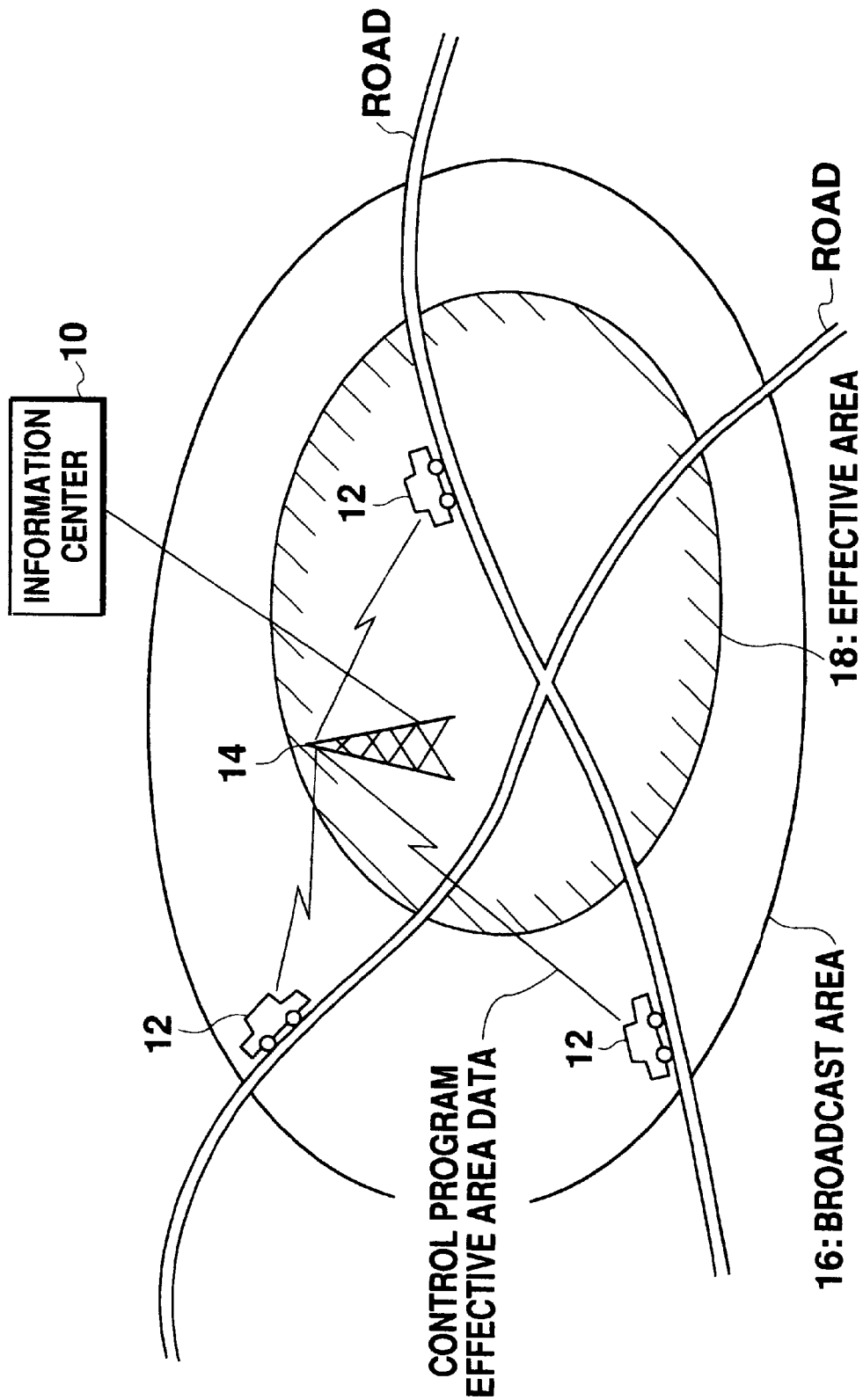
FIG. 1 shows an on-vehicle device control system of an embodiment of the present the invention.

The following describes a first preferred embodiment of the present invention with reference to the drawings. FIG. 1 shows an overview of this embodiment of an on-vehicle device control system comprised with an information center 10, which is an infrastructure facility, and a control apparatus (not illustrated) equipped on a vehicle 12. A control apparatus controls an on-vehicle device as a control target which may be any arbitrary device that can be controlled by a computer, for example a motor or a navigation unit. In addition, this invention is applicable to the control of any other devices.

The information center 10 is provided with control programs to be used to control on-vehicle devices. In this embodiment, the information center 10 gathers information about circumstances in each region, which may, for example, be represented by environmental conditions of a region and also represented by political requirements of a region. The latter may be provided with limitations imposed on vehicles. On the basis of gathered information, the information center 10 creates control programs fits to a specific region. A control program can be provided to the information center from the outside and may be either the entire program consisted of all the functions to control an on-vehicle device or a program module handled as a part of the entire programs package.

A specific region where a control program should be applied to is designated as an effective area 18. The effective area 18 can be of arbitrary size and shaped and may, for example, be defined using an outline of the region or using an administrative boundary such as that of a state or city, defined using dimensions determined by a combination of a radius and a center, or defined using a road. In the last example, the combinations of a starting point and an endpoint established on roads are adopted for the definition of the area as necessary, and a vehicle on a corresponding road represents that the one locates within the effective area 18.

An information center 10 sends control programs to a vehicle 12 with data indicating the effective area 18. Data may be transmitted by broadcasting methods from a broadcast antenna 14 to the vehicle 12 locating within a broadcast area 16 where is configured to become wider than an effective area 18.

On the vehicle 12, a control apparatus receives control programs and data about their effective area. Control programs are then retained in a memory. Next, a decision whether the vehicle 12 locates within the effective area or not is made based on a comparison of the detected current location with the effective area 18. In this embodiment, a GPS unit for navigation, which will be described below, is used as a positioning means. If the vehicle 12 is inside the effective area 18, the control program will immediately begin control of the relevant on-vehicle device. If the vehicle 12 has not entered the effective area 18, the program will remain in a dormant state and wait for the vehicle to enter the effective area before applying on-vehicle device control. When the vehicle 12 leaves the effective area 18, execution of the control program transmitted from the information center 10 will terminate, and when necessary the control program will be deleted from the memory.

Figure 2:
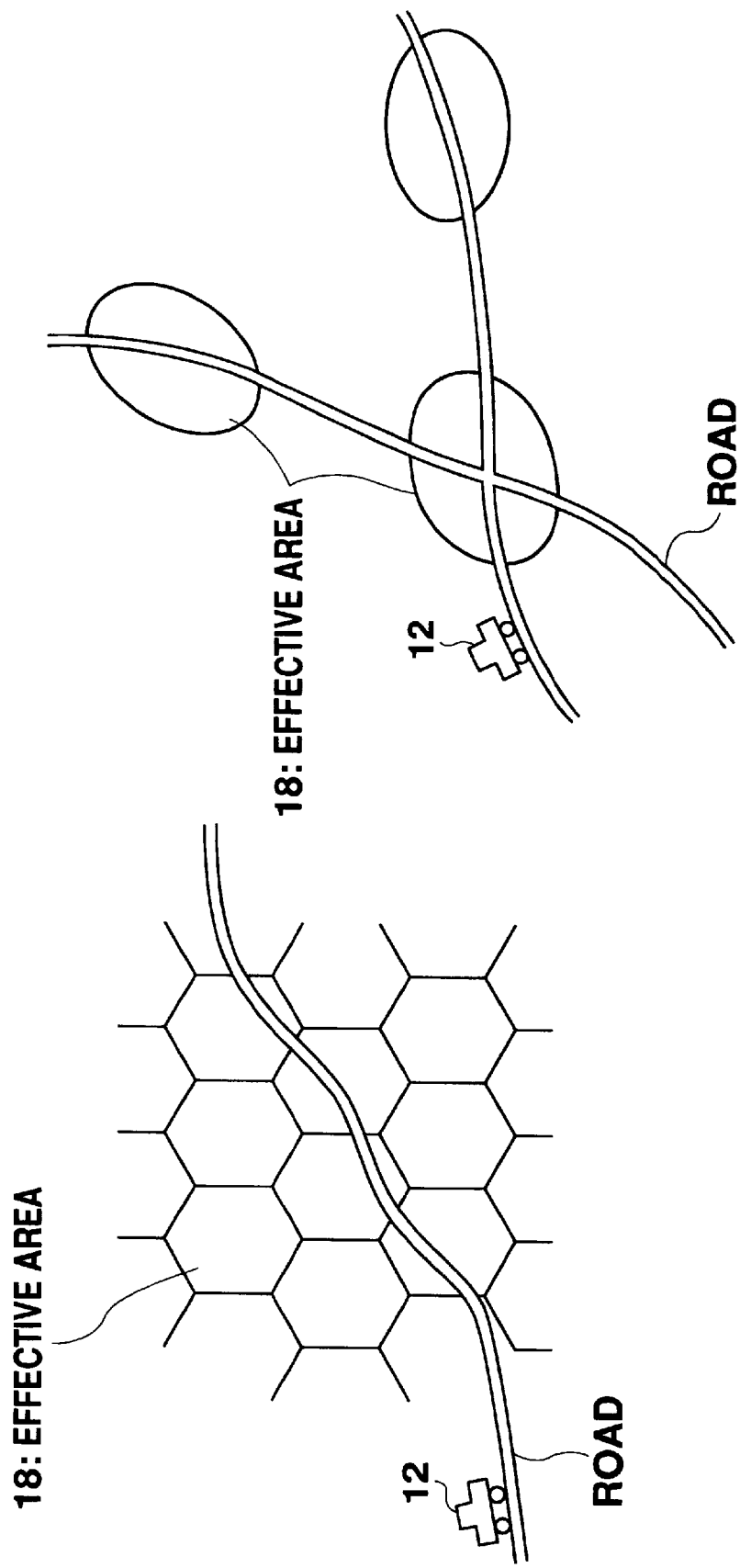
FIGS. 2A and 2B show examples where effective areas of a control program are configured.

FIG. 2A and FIG. 2B shows examples of how an effective area 18 may be configured. As shown in FIG. 2A it is possible to configure multiple effective areas 18 adjoined each other leaving no space between them. A control apparatus on the vehicle 12 receives a control program appropriate to the effective area 18 from the information center 10 at every effective area 18 it goes to in order to control an on-vehicle device through the use of the received program.

In this embodiment, as mentioned above, program modules that are components of the entire program may apply to the vehicle 12. If this is the case, a standard control program must always be installed on the vehicle and the standard control program is used in conjunction with program modules received at each effective area 18.

On the other hand, as shown in FIG. 2B it is also possible to configure a number of remote effective areas 18. When a vehicle 12 on which the standard control program is installed is not located in an effective area 18, a standard control program is used to control the on-vehicle devices, and, when it enters into an effective area 18, the control program transmitted by an information center 10 is used for control. As an alternative, modules sent by an information center 10 may be used in conjunction with the standard program.

Figure 3:
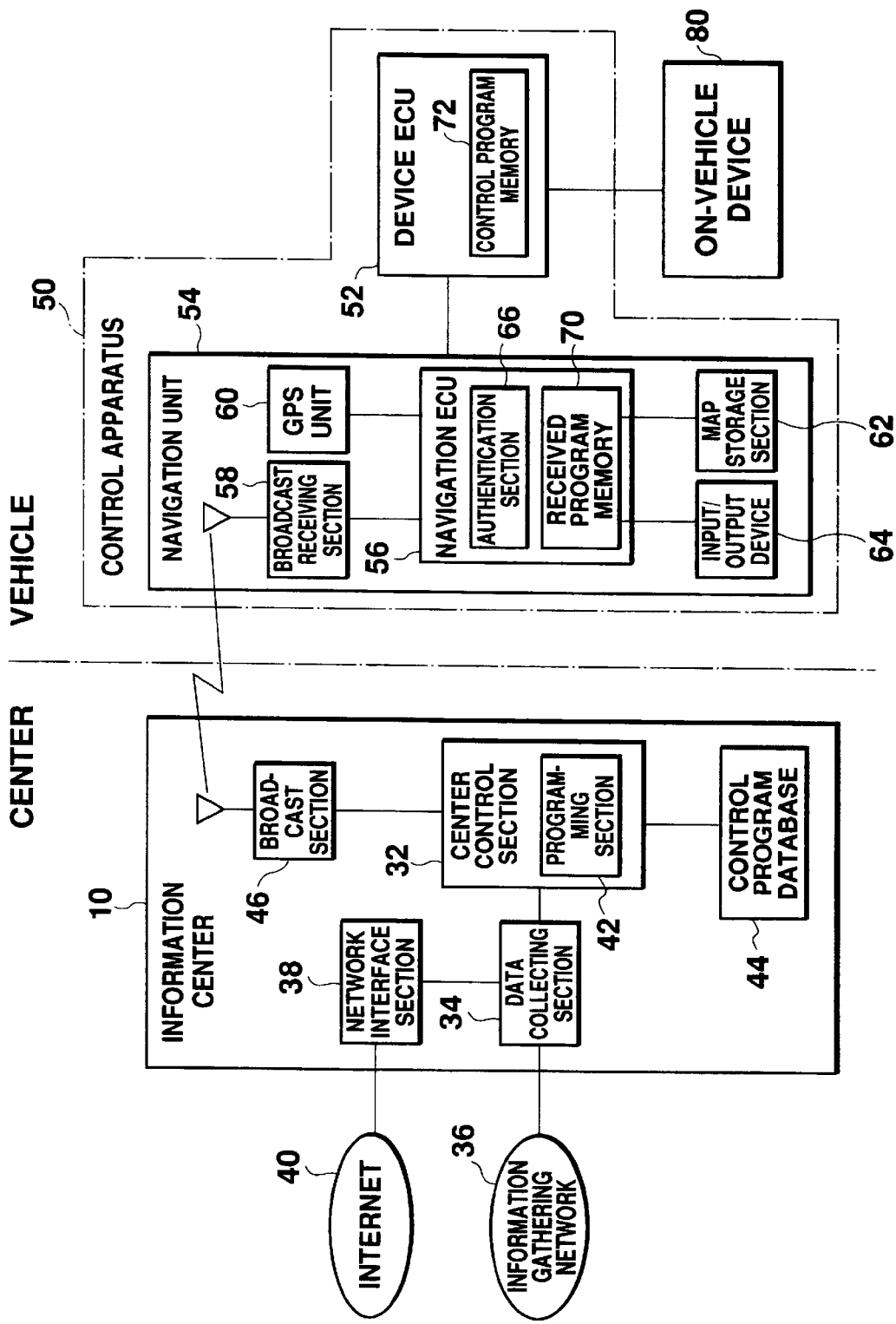
FIG. 3 is a block diagram illustrating a configuration of the on-vehicle device control system shown in FIG. 1.

FIG. 3 is a block diagram showing the configuration of an on vehicle device control system according to this embodiment. The information center 10 has a center control section 32 that controls the entire center, and to this center control section 32, a data collecting section 34 is connected. To the data collecting section 34, an information gathering network 36 is connected in order to collect and monitor information regarding conditions in each region successively. In addition, the data collecting section 34 gathers information from the Internet 40 via a network interface section 38. These elements gather the information relating to the above mentioned environmental conditions and political requirements (e.g. regulatory constraints). And the gathered information is transmitted to the center control section 32, which determines which method for controlling an on-vehicle device should apply to each region in accordance with the received information. As a consequence of the determination, a programming section 42 generates a control program appropriate to the control of the on-vehicle device and creates data designating the effective area of the program. As an alternative to this, it is possible to predefine effective areas fixedly, and generate a control program which fits to the fixed areas according to the information gathered from there.

The center control section 32 can create several kinds of control programs for on-vehicles devices respectively based on the information varying from an on-vehicle device to another on-vehicle device; for example, a control program for a particular device may be created based on environmental conditions, and that for another created based on regulatory requirements. Above those it is preferable to create a control program based on one or more types of information. An effective area can also be configured using different sizes and patterns depending on control programs.

Furthermore, it is preferable to create multiple control programs, which execute individual control of each type of conditions, and data designating their effective area in advance. The programs created beforehand are stored in a control program database 44 from where the center control section 32 read out appropriate control programs and their effective areas in accordance with the information received from the data collecting section 34.

A control program and data designating its effective area is transmitted from the center control section 32 to a broadcast section 46 in order to broadcast to a vehicle. A broadcast area as stated above is established wider than an effective area. The broadcast section 46 may be a satellite broadcasting apparatus, in which case broadcasting data is transmitted to a vehicle via a satellite. The data can then be transmitted as encrypted data so that it becomes possible to limit a vehicle as a destination of the broadcasting data.

Referring now to the composition of a vehicle side, a control apparatus 50 on a vehicle side has a device ECU 52 which directly controls an on-vehicle device 80 of a control target as well as a navigation unit 54. The navigation unit 54, as known well, guides a driving route of a vehicle to a user. In this embodiment, the navigation unit 54 functions as a portion of the control system of this invention, i.e. the navigation unit 54 performs the role to manage a control program transmitted from the information center 10 in addition to the usual role of a rout navigation function.

In the navigation unit 54, a navigation ECU 56 controls whole the navigation unit. And a broadcast receiving section 58 is connected to the navigation ECU 56. The broadcasting data sent by the information center 10 are received at the broadcast receiving section 58 and from there it is sent to the navigation ECU 56.

The navigation ECU 56 is also connected to a GPS (Global Positioning System) unit 60 which detects the current location of a vehicle based on radio waves sent from an artificial satellite and sends location information to the navigation ECU 56. Also, any positioning systems other than the GPS unit 60 can apply to this embodiment therefore a positioning system used for satellite navigation, electric navigation or self navigation can be applied. To the navigation ECU 56, a map storage section 62 is also connected. The cartographic information stored in the map storage section 62 is utilized for various kinds of processing which relates to route guidance. Furthermore, an input/output device 64, comprising a display, a speaker set, and switches, is connected to the navigation ECU 56.

As stated above the broadcasting data including a control program and its effective area is received by the broadcast receiving section 58 and passed to the navigation ECU 56. The control program and data designating its effective area is temporally retained in a received program memory 70 of a memory. An authentication section 66 provided in the navigation ECU 56 authenticates the received control program and data about the effective area in order to determine whether those are reliable or not. If those are determined not to be reliable, the authentication section 66 deletes the control program and data.

The navigation ECU 56 compares the current location entered by the GPS unit 60 with the effective area and decides whether the current location sites within the effective area or not through the use of the cartographic information stored in the map storage section 62 as necessary. When the current location has already sited within the effective are, the navigation ECU 56 immediately sends the control program to the device ECU 52 along with an instruction that indicates application of the control program to device control. When the current location has not sited within the effective area yet, the received program memory 70 retains the control program, which is sent to the device ECU 52 after the current location reaches to the effective area.

A vehicle may move away from the effective area without entering the area. If this is the case, the navigation ECU 56 deletes the control program from the received program memory 70. In this embodiment, the point in time to delete the programs is established when the vehicle moves out from the broadcast area.

The control program transferred from the navigation ECU 56 to the device ECU 52 is stored in a control program memory 72 of a memory, which holds previously obtained control programs. Consequently, the new control program must either replace the existing control programs or be written in a different area from them.

The device ECU 52 controls an on-vehicle device 80 through the use of the entered control program according to the instructions received from the navigation ECU 56. At this time the device ECU 52 generates necessary control signals based on the control program and outputs these to the on-vehicle device 80 which operates according to the input signals. After the new control program begins running existing programs will be deleted as occasion demands.

In this embodiment, as stated above, a standard control program may be installed to a vehicle side. If this is the case, the control program transferred from the information center 10 is written in a memory area other than the standard one. If the standard program is already running, operation is switched to the new control program.

Furthermore, in this embodiment, a program module may be transmitted stated above. In such a case, the module is written in a memory area other than that of the standard program and control through the combination of a program module and a standard program begins to operate.

The navigation ECU 56 continues to monitor the current location after the control program is put in commission in order to determine whether the current location of the vehicle moves out of the effective area. When the vehicle moves out from the effective area, the navigation ECU 56 outputs an instruction for terminating the execution of the control program to the device ECU 52. As a result of this, the device ECU 52 aborts the execution of the control program and takes steps to apply the standard control program.

In addition, in this embodiment an on-vehicle device of control target may be the navigation unit 54 itself. In this configuration, the navigation ECU 56 uses the control program for its own sake when the current location reaches to the effective area.

Examples of control process preferably applying this embodiment will next be described.

(1) In this example, control based on environmental conditions is carried out. The vehicle 12 is a hybrid car and the on-vehicle device 80 of a control target in FIG. 3 is a motor. The motor of a hybrid car, as is well known, consists of an engine and an electric motor. A feature of the motor varies rather widely by governing output power of both components and their allocation. This makes it possible to limit a noise and emission gas and to produce a high-power output when necessary. Accordingly, the information center 10 in this embodiment creates the power control program appropriate to environmental conditions in an effective area and transmits this to the vehicle 12. Through the use of the power control program control which is amenable to environmental conditions in the effective area is carried out, which allows the hybrid car to fulfill its potential.

Figure 4:
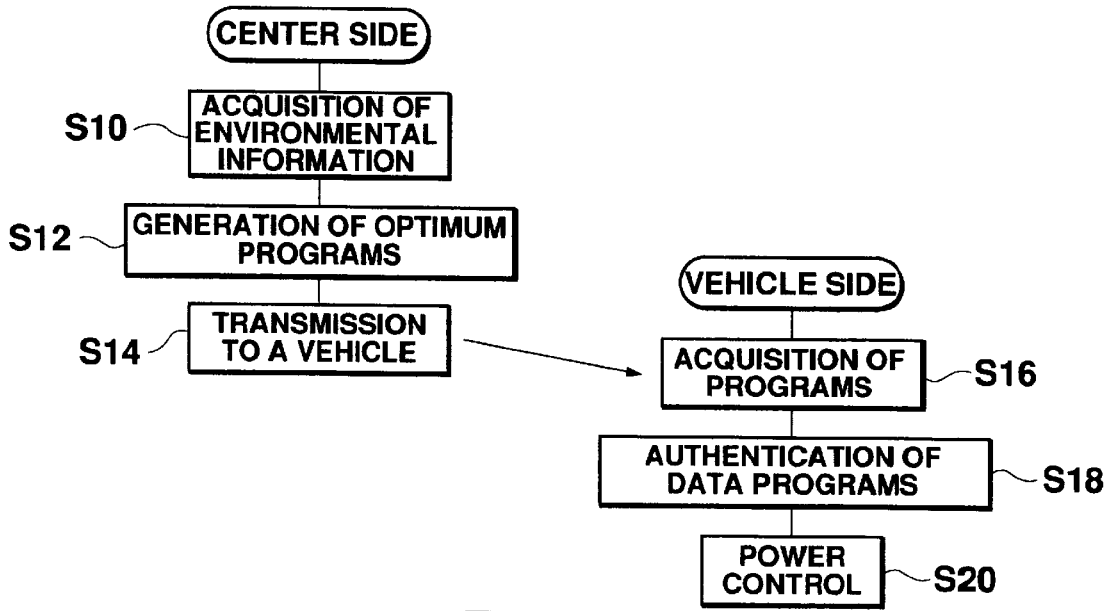
FIG. 4 is a flow chart illustrating a process to transmit a power control program for a hybrid car in accordance with an example applied to one embodiment of the invention.

FIG. 4 illustrates a process when this embodiment is applied to control a hybrid car. In the information center 10, a data collecting section 34 collects information regarding environmental conditions via an information gathering network 36 or the Internet 40 (S10). The center control section 32 creates a power control program to govern the components of a motor, i.e. an engine and an electric motor (S12). Based on the gathered information, the center control section 32 creates a power control program that is the most suitable to the environmental conditions in a specific region. The created power control program is transmitted along with data designating its effective area to a vehicle via a broadcast section 46 (S14).

On a vehicle, the power control program and the data of its effective area are received at the broadcast receiving section 58 and then passed on to a navigation ECU 56 (S16). An authentication section 66 belonging to the navigation ECU 56 authenticates the received power control program and the data about its effective area and judges their reliability (S18). The authenticated power control program is used to control the engine and the electric motor while the vehicle exists in the effective area (S20).

(2) The above-stated example (1) illustrates control related to environmental conditions. In contrast to this, it is also preferable to transmit a control program that reflects requirements such as regulations in a region to a vehicle via an information center. The control program may be forcibly transmitted to a vehicle and booted up.

Suppose that in a certain region, for example, a regulatory requirement limits the amount of noise and emission gas. The information center 10 collects information regarding such a region and transmits a power control program to suppress noise and emission gas forcibly (to be more concretely, the program which mainly utilizes an electric motor) to a vehicle, on which the transmitted power control program is immediately booted. This enables a car to meet the requirements of the region in which it drives.

Figure 5:
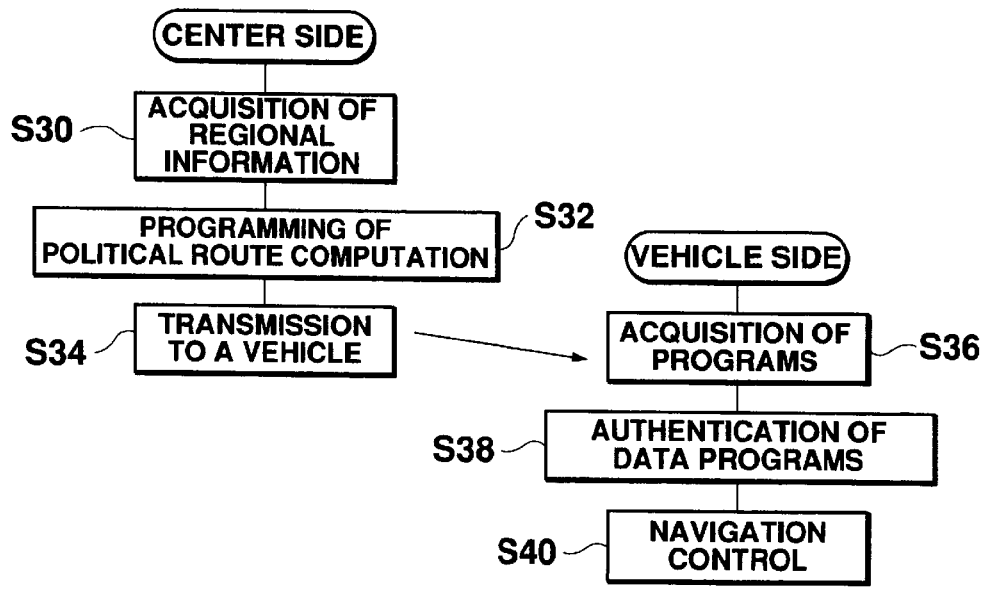
FIG. 5 is a flow chart illustrating a process to transmit a route computation program for navigation in accordance with an example applied to one embodiment of the present invention.

(3) In this example, the control of a navigation unit equipped on a vehicle is carried out. Suppose that in a certain region there is a demand that specific route guidance be positively performed by a navigation unit on a vehicle coming from the outside of the region. The specific route guidance may include information of various sightseeing spots of the region so that the vehicle can travel around those spots in an appropriate order, and may exclude local roads of the region, such as residential or shopping area. As shown in FIG. 5, the information center 10 obtains regional information designating such political requirements (S30) and creates a route computation program reflects those based on the acquired information (S32). A route computation program is a program to search for an appropriate path for route guidance through the use of cartographic data on the basis of the Dijkstra method or the like. The created route computation program is transmitted from the broadcast section 46 to a vehicle along with the data designating its effective area (S34).

On a vehicle, the route computation control program and data concerning its effective area are received at the broadcast receiving section 58 and passed to the navigation ECU 56 (S36). An authentication section 66 that belongs to the navigation ECU 56 authenticates the received route computation program and data about its effective area in order to judge its reliability (S38). The authenticated route computation program is used by the navigation ECU 56 itself to compute the route under the control of the navigation unit 54 (S40).

Up to this point, an on-vehicle device control system of a first embodiment is illustrated and now describes a modification example of this system.

(a) In the first embodiment, the navigation unit 54 functions as a portion of the on-vehicle device control system and manages the control program transmitted from the information center 10. The navigation unit 54, however, may be removed from this system. For instance, the control program received from the information center 10 is directly inputted to the device ECU 52, and the GPS unit 60 is directly connected to the device ECU 52. The device ECU 52 may manage all the control programs by itself and boot the necessary program within the effective area.

(b) As is apparent from FIG. 1, a vehicle 12 an effective area first receives a control program when the vehicle actually enters into the broadcast area 16. Subsequently, the received control program is booted up when it enters into the effective area. This causes a time lag to a certain extent between receiving and boot-up of a control program. The length of the time lag varies depending on the settings of the broadcast area 16 and the effective area 18. A longer time lag raises the possibility that environmental conditions may change between program receiving time and booting time.

Thus, in this example modification, the information center 10 predicts environmental conditions in the future. Considering that the aforementioned time lag between receiving and boot-up, the information center here predicts the environmental condition at boot-up of the program and provides the control program which is amenable to the predicted environmental condition. This program is transmitted from the information center 10 to the vehicle 12 at the point in time as back as the said time lag behind the boot-up. Such a process like this allows the preferable control to be carried out when an environmental condition changes rather widely from the receiving time to the boot-up time of the program.

Figure 6:
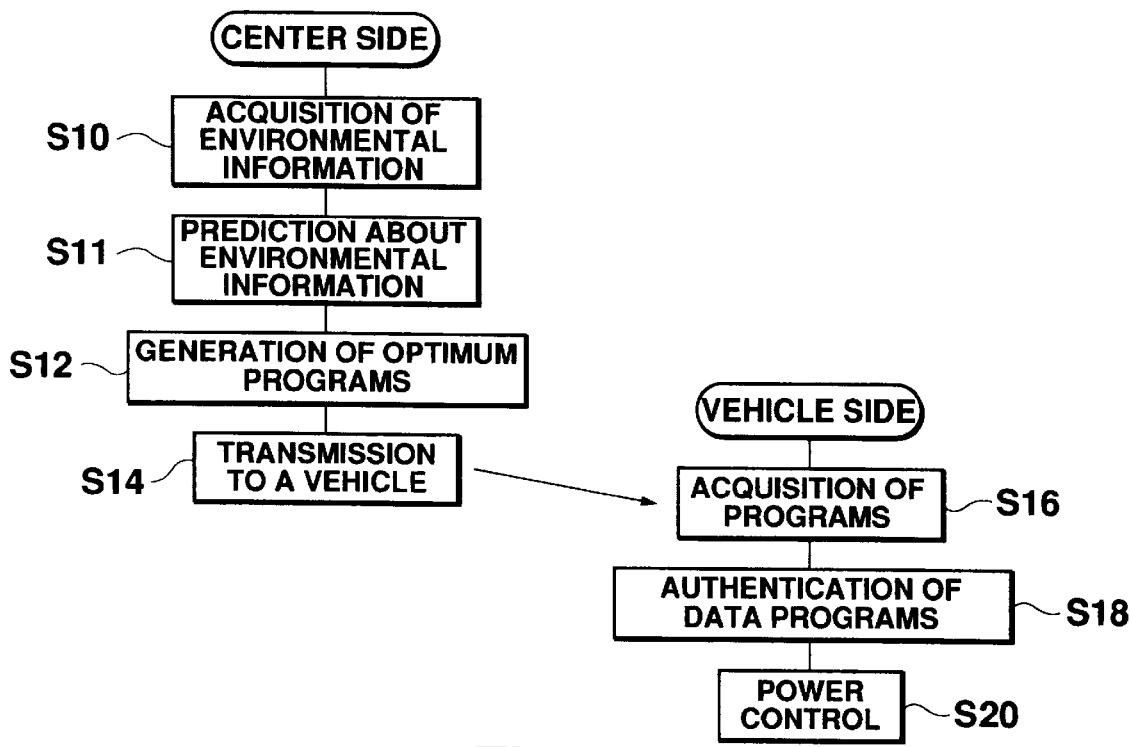
FIG. 6 shows a modified example of the process of FIG. 4.

FIG. 6 is a flow chart showing a process of an example of this modification. Referring in comparison to FIG. 4, the step to predict environmental condition (S11) is appended before the step to create a control program at the information center 10 (S12).

A modification of above (b) can be applied to transmit in a like manner a control program which is applicable to regulatory requirements.

(c) In the first embodiment, a control program is transmitted to an arbitrary car driving within a broadcast area by the broadcast method. As opposed to this, the information center 10 can carry out individual communication with each vehicle 12. The information center 10 and each vehicle 12 are respectively equipped with a communication device for individual communication. The communication device on the side of the information center 10 authenticates a vehicle's identification at communication. The communication device may be one of the types using satellite communication or may be a portable telephone unit such as a cellular phone.

Figure 7:
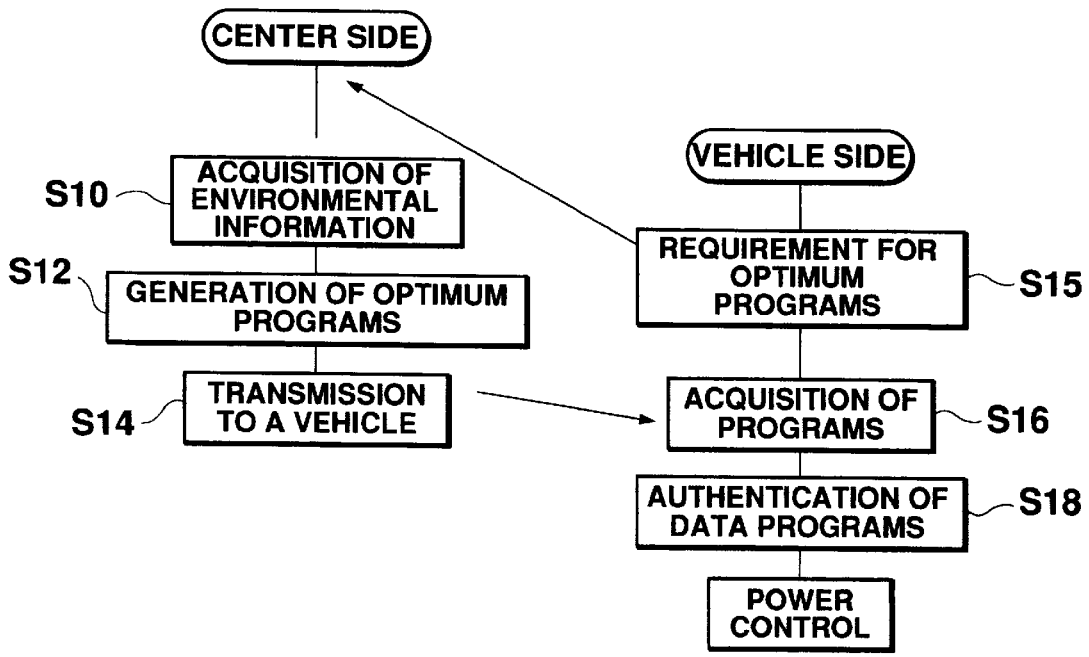
FIG. 7 is a flow chart illustrating a process to transmit a control program according to an individual communication method in accordance with an modification example of the embodiment.

FIG. 7 is a flow chart showing a process of an example of this modification example. Referring in comparison with FIG. 4, the step to require an optimum program for the information center 10 (S15) is appended to the process on the vehicle side.

In the first embodiment, a broadcast area is established so as to encompass an effective are and a vehicle obtains a control program before an access to the effective area. For a case employing individual communication like this modification example, it may also be preferable to transmit a control program to a vehicle before its access to the effective area.

EMBODIMENT 2

The first embodiment was focused on environmental conditions and regulatory requirements that vary among "locations" so that the control appropriate to a region is carried out. A second embodiment focuses on conditions that also vary over time. Consequently the region (effective area) in the first embodiment is replaced with a time period (effective period) in the second embodiment.

The composition of the second embodiment is very similar to that of the first embodiment as illustrated in FIG. 3. In the information center 10, the data collecting section 34 gathers information regarding circumstances such as environmental conditions in each point in time via the information gathering network 36 and the Internet 40. The center control section 32 determines what type of control should be provided to an on-vehicle device in each period based on the gathered information. As a consequence of the determination, the programming section 42 generates a control program appropriate to the control of an on-vehicle device and creates data designating the effective period. An effective period is a period in which the control program should be applied for, established as a substitute for an effective area in the first embodiment, and can be set using an arbitrary form. It can be defined by the combination of both starting time and ending time, or defined by only one of those. The effective period can also be defined based on any criteria such as a year, month, week, date, or time. For example, it can be set as a certain time period established on a day of a week.

A control program and data designating its effective period are transmitted from the center control section 32 to the broadcast section 46 in order to broadcast to a vehicle. The broadcast receiving section 58 on the vehicle side receives the broadcasting data and transmits it to the navigation ECU 56. The control program and data about its effective period is stored in the received program memory 70 and authenticated by the authentication section 66.

The navigation unit 54 comprises a built-in clock (not illustrated) as a means of time detection and judges whether or not the present time is within the effective period. If the present time is already within the effective period, the navigation ECU 56 immediately sends the control program to the device ECU 52. At this time, the instructions which allow the device ECU 52 to use the control programs are sent along with the control program. If the present time is not within the effective period, the control program is stored in the received program memory 70 and transmitted the device ECU 52 when the present time reaches the time within the effective period.

The control programs transmitted from the navigation ECU 56 to the device ECU 52 are stored in a control program memory 72. Then the device ECU 52 controls the on-vehicle device 80 according to the instruction transmitted from the navigation ECU 56.

The navigation ECU 56 continues to monitor the present time after bootup of the control program in order to decide whether or not the effective period has terminated, i.e. whether or not the present time becomes after the end point of the effective period. It produces an output to provide the instruction for the termination of the control program at the end point of the effective period.

When the effective period is established as a specific time period in a day or the like, it may be repeatedly applied. If this is the case, the control program is successively held in the control program memory 72 and the navigation ECU 56 provides the instruction for boot-up of the control program to the device ECU 52 at every starting point in time of the effective period.

Up to this point, the second embodiment of an on-vehicle devise control system is illustrated. In principle, the detailed part of the first embodiment can apply to that of the second embodiment in a like manner through the replacement of an area with period. In addition, various sample modifications of the first embodiment can similarly be applied to the second embodiment.

It may also be preferable to incorporate the second embodiment into the first one. In this case, the information center 10 sends the control program that is amenable to circumstances (environmental conditions, etc.) in a certain region during a certain period to a vehicle. The effective area and the effective period of those are send simultaneously with the control program. And then on the vehicle side, when both the current location is within the effective area and the present time is in the effective period, the control program can only apply to an on-vehicle device. The composition like this enables to achieve more preferable control that is most amenable to both effective areas and periods.

The preferred embodiments of this invention are explained up to this point. As described in the aforesaid embodiments, an on-vehicle device control apparatus receives the control program in conjunction with its effective area and/or its effective period and apply the received control program to an on-vehicle device within its effective area and/or effective period. Therefore in corresponding areas and/or periods it is possible to obtain the program which is necessary or suitable for the region and/or the time period for use. This makes control responding to circumstances which varies with locations or time implementable. As a result, comprehensive but complicated programs become unnecessary and an increase in the storage capacity required for a program memory can be avoided. This also eliminates such waste as to install particular programs always even in the outside of the region or the time period in which they are necessary. Therefore, this makes device control responding to various changes in conditions easy and inexpensive.

What is claimed is:

1. An on-vehicle device control system comprising:
   an information center for transmitting a control program for controlling an on-vehicle device equipped on a vehicle in conjunction with geographical data designating an effective area of said control program; and
   a control apparatus equipped on said vehicle for controlling the on-vehicle device in accordance with said control program transmitted from said information center; wherein
   said control apparatus includes positioning means for detecting a current geographical location of the vehicle and applying said control program when the detected current geographical location is within said effective area and memory means for storing said control program until the detected geographical location lies within said effective area.

2. An on-vehicle device control system according to claim 1, wherein said information center transmits said control program and said effective area to said vehicle along with data designating the effective period during which said control program should be applied, and wherein
   said control apparatus includes time detecting means and applies said control program when the detected present time is within the effective period.

3. An on-vehicle device control system according to claim 1, wherein said information center transmits said control program through broadcasting means and a broadcast area is configured to encompass said effective area therein.

4. An on-vehicle device control system according to claim 1, wherein said control apparatus comprises a navigation unit for performing route guidance and manages said control program based on the detected current location.

5. An on-vehicle device control system according to claim 4, wherein said navigation unit manages said control program through the use of cartographic data for navigation.

6. An on-vehicle device control system according to claim 1, wherein
   said vehicle is a hybrid car,
   said on-vehicle device is a motor including an internal combustion engine and an electric motor, and
   said control program is a power control program which controls said motor.

7. An on-vehicle device control system according to 1, wherein said on-vehicle device is a navigation unit and said control program is a route computation program for generating a route to be guided.

8. An on-vehicle device control system which controls an on-vehicle device equipped on a vehicle, comprising:
   an information center for transmitting a control program to be used for controlling said on-vehicle device to said vehicle in conjunction with data designating the effective period during which said control program should be applied; and
   a control apparatus equipped on said vehicle for controlling said on-vehicle device through the use of said control program transmitted from said information center; wherein
   said control apparatus includes time detecting means and applies said control program when the detected present time is within said effective period and memory means for storing said control program until the detected present time is within said effective period.

9. An device control apparatus which is equipped on a vehicle and controls an on-vehicle device comprising:
   receiving means for receiving a control program transmitted from the outside of said vehicle and used for controlling said on-vehicle device and data designating the effective area in which said control program should be applied, and
   positioning means for detecting current location of said vehicle, wherein
   said control apparatus controls said on-vehicle device through applying said control program when the detected current location lies within said effective area and memory means for storing said control program until the detected current location lies within said effective area.

10. A device control apparatus which is equipped on a vehicle and controls an on-vehicle device, said apparatus comprising:
    receiving means for receiving a control program transmitted from the outside of said vehicle and used for controlling said on-vehicle device, and data designating the effective period in which said control program should be applied, and
    time detecting means to detect present time, wherein
    said control apparatus controls said on-vehicle device through applying said control program when the present time is within said effective period and memory means for storing said control program until the detected present time is within said effective period.

* * * * *